United States Patent [19]

Wayt

[11] Patent Number: 4,848,974
[45] Date of Patent: Jul. 18, 1989

[54] APPARATUS AND METHOD FOR FLUIDIZED CONVEYING FLAT ARTICLES

[76] Inventor: Thomas A. Wayt, 2365 Whitacre Ave., S.E., Minerva, Ohio 44657

[21] Appl. No.: 101,116
[22] Filed: Sep. 25, 1987
[51] Int. Cl.$^4$ .............................................. B65G 53/20
[52] U.S. Cl. ...................................... 406/88; 406/108
[58] Field of Search ....................... 406/86, 87, 88, 89, 406/108, 109

[56] References Cited

U.S. PATENT DOCUMENTS

| | | | |
|---|---|---|---|
| 3,684,327 | 8/1972 | Hurd | 406/86 |
| 3,734,567 | 5/1973 | Fong | 406/86 |
| 4,521,130 | 6/1985 | Lenhart | 406/86 |

FOREIGN PATENT DOCUMENTS 37923  4/1981  Japan ..................... 406/86

Primary Examiner—Sherman D. Basinger
Assistant Examiner—Paul E. Salmon
Attorney, Agent, or Firm—Oldham & Oldham Co.

[57] ABSTRACT

This invention permits flat articles to be fluid conveyed from one operation to a point where another operation occurs such as curling, stacking or feeding to a capping machine. The flat articles are moved in a preferred embodiment in essentially parallel rows to an opening in a tunnel conveyor by fluids moving primarily in parallel alignment with the rows of flat articles and prior to their complete entry into the tunnel are contacted on each flat side by streams of fluid to change the angle of movement of each articles, by about 30° and preferably 90° more to move each article to exit of said tunnel with part of the streams of fluid being vented through openings in the tunnel.

17 Claims, 3 Drawing Sheets

APPARATUS AND METHOD FOR FLUIDIZED CONVEYING FLAT ARTICLES

FIELD OF INVENTION

This invention relates to an apparatus and method for fluidized conveying essentially flat articles, such as beer can lids, from one place to another where they are fed into receptacles, such as a stacker, a curling machine, or even to be placed on a can. More particularly, this invention relates to a tunnel conveyor having a passage and an air feed means to align the articles in the passage of said tunnel and air means in an opposite walls of said tunnel to change the direction of movement of said article preferably by about 90° to effect movement of said articles in spaced apart aligned relationship.

BACKGROUND ART

The movement of can lids and related flat shaped articles from the stamping press to the curling machine is relatively difficult as each of the lids must be moved in a controlled spaced arrangement to feed onto the curling or crimping machine to be crimped to the desired shape prior to receiving the adhesive or thermoplastic resin in the sealing area of the circumference groove of the lid.

Currently, an elastomeric belt together with a vacuum means is used on the stamping press or shell press of the minster press type to handle the lids being stamped or punched out on the so called die cushion or anvil means. Where the press punches 22 lids per stroke with the lids being air blown onto an inclined conveyor which drops the lids on a very fast moving belt. These belts wear out very quickly and have to be replaced. The replacement of these belts results in several hours of down time plus the enormous cost of the replacement belt.

When air conveyors were attempted to be used to handle beer cans lids, problems were experienced with shingling and other problems, so belt conveyors are still used.

THE INVENTION

Applicant has created a fluid or air type conveyor that moves the relatively flat articles, such as lids or bottoms for cans, from one operation to another in essentially an indexing or fixed aligned spaces relationship and thus avoids the tendency of air borne flat articles to bunch up or plug the conveyor channel due to shingling. Further this fluid or air conveyor receives the flat articles in the feed means and orientates the article to be fed in multiple numbers in the conveyor at the same time yet changes the direction the feed moves to move the flat article in essentially spaced apart alignment to end of the conveyor to deposit the article in the next step of manufacture, storage or usages.

THE DRAWINGS

The nature of this invention, its best mode and advantages, may be readily seen by reference to the drawings where FIG. 1 is a partial plan view of the conveyor tunnel with the fed means attached thereto;

BEST MODE FOR CARRYING OUT THE INVENTION

Figures 1, 2:
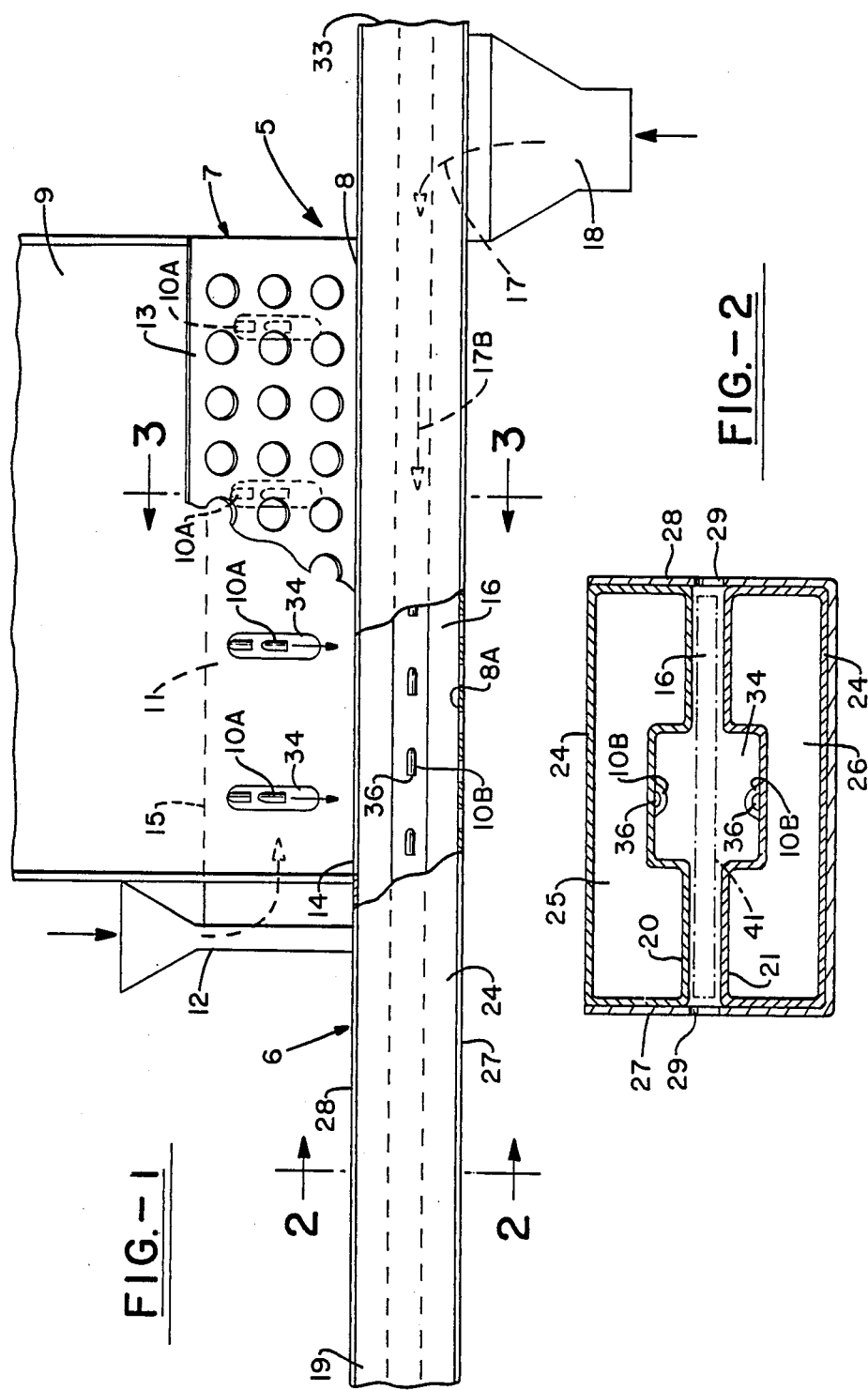
FIG. 2 is a cross-sectional view taken along lines 2—2 of FIG. 1.

The apparatus 5 of FIG. 1 comprises a tunnel 6 and a feed means 7 with the feed means 7 being attached and fitted to an entrance opening 8 of the tunnel.

Figures 3, 4:
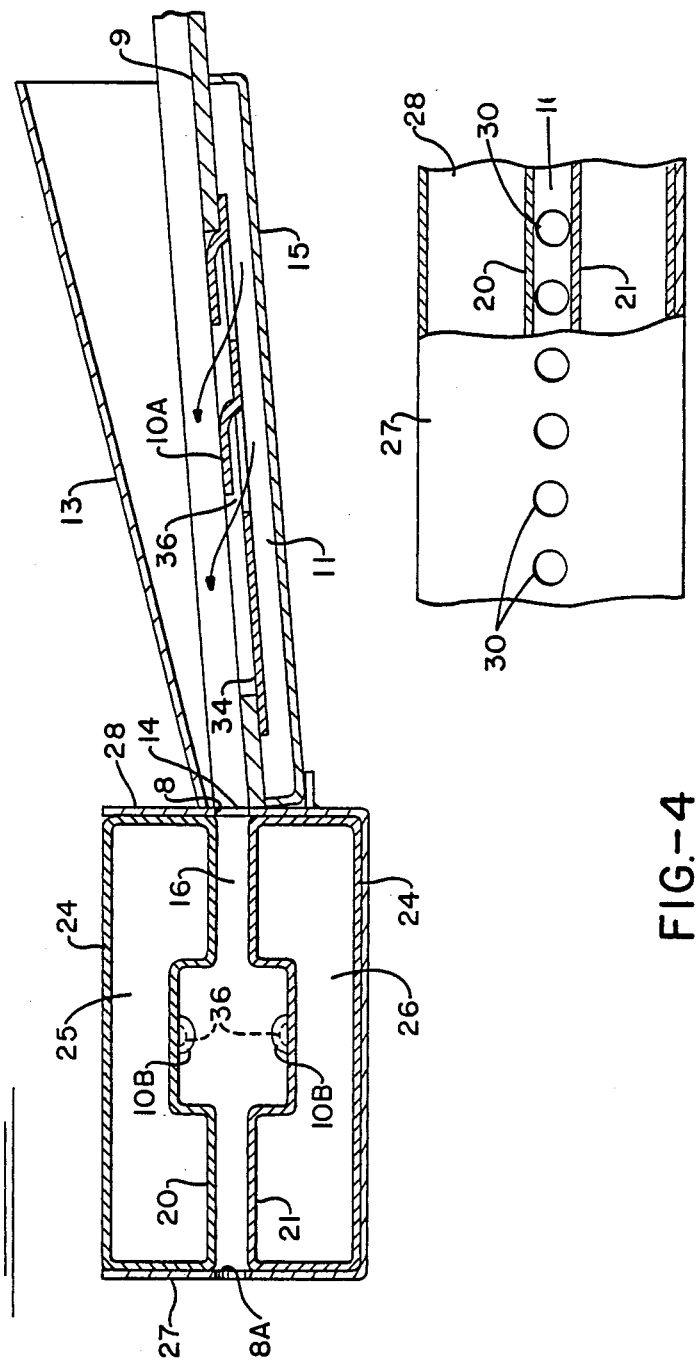
FIG. 3 is a cross-sectional view taken along lines 3—3 of FIG. 1.
FIG. 4 is a partial side elevational view of the tunnel of FIG. 1.

The nature of the feed means 7 can be seen best in FIGS. 1 and 3 and comprises a flat member 9 such as a flat plate containing preferably recessed air inlets 10A with an incline plate 13 spaced above the flat member 9, at feed exit end 14, preferably a distance of about 0.25 centimeters greater than the width of the entrance opening 8. Incline plate 13 preferably is of a foraminous construction with the holes usually of 0.5 to 3 cms therein being sufficient to prevent back pressure build up and to allow the flat articles to rest on their flat side as they are moved toward the tunnel primarily by force of air from air inlets 10A or herein after called nozzles to distinguish from air inlets 10B.

As indicated above air inlets or nozzle 10A preferably are recessed in flat member 9, which are connected to air chamber 11 which in turn is connected to air duct 12. Air duct 12 may be connected with suitable piping or flexible hose, (not shown) via a regulator valve (not shown) to an air supply (not shown). By proper operation of the regulator valve to supply about 5 to 60 and preferably 10 to 15 PSI air to air chamber 11, air chamber 11 is formed by backing plate 15 connected to the flat plate 9. This air pressure will cause air to be jetted through the air inlets 10A to lift the flat articles and propel them into and through the tunnel entrance opening 8.

Experience has shown that as lids move through entrance opening 8, they tend to hit the far wall 8A of passage 16 and bounce back to stack in shingle fashion in the entrance. This requires adjustment of the air pressure on air inlets 10A but my experience is that even adjustment of the air pressure in inlet 10A alone does not entirely avoid shingling.

Thus a major aspect and improvement in my invention comprises contacting the lid as it moves even partial to entirely through opening 8 with a jet of air moving in the direction shown by arrow 17. This jet of air absorbs the force driving the lid into passage 16 and forces the lid to move down the tunnel in the direction shown by arrow 17B. Naturally, the adjustment of the air pressure is an operator function depending on the size and the weight of the lid and the number of lids being fed simultaneously into the entrance opening. Thus, the operator would adjust the air pressure by the regulator valve (not shown) on the air lines connected to the tunnel duct 18 and air duct 12 to visually control movement of the lids away from the entrance opening 8 down passage 16 toward its end 19. The nature and some of the configuration of the tunnel 6 is seen best in FIGS. 1, 2, 3 and 4.

FIGS. 2 and 3 show the cross-section of the tunnel 6 where numerals 20 and 21 show the pair 23 of spaced apart walls having the recessed air inlets 10B sometimes herein referred to as spouts, positioned essentially near the mid-portion of the walls 20 and 21. Each of the walls 20 and 21 respectively are covered preferably with a square C-shape plate 24 to form with the side walls 20 and 21 air ducts 25 and 26, respectively, to permit the air from tunnel duct 18 to pressurized each of ducts 25 and 26 respectively and supply jet of air directed in the direction shown by arrow 17 from each of the side walls 20 and 21 to maintain the flat article essentially centered in the passage 16. The passage 16 is enclosed by placing closure walls 27 and 28 respectively in the position shown in FIGS. 1, 2 and 3. These views of the closure walls 27 and 28 show they each contain at least one opening 29 therein and preferably a series of spaced apart openings 30 as seen best in FIG. 4 to permit the air pressure to be vented and thus give greater freedom to the operator in controlling the air pressure to move the lids away from the feed opening to alleviate shingling.

In FIGS. 2 and 3, the passage in the tunnel or its cross-section is shown as a cross in shape with one pair of vertical arms being shorter than the pair of lateral arms. Generally the lateral arms have a total length greater than the flat dimension of the flat article but no greater than the flat dimension plus 0.5 centimeters.

It is desirable that the openings be positioned in or near the center line of each of sides 27 and 28. Usually, these openings are about 0.2 to 1.5 and preferably 0.4 to 0.6 cm. in diameter for the usual beer can lid and may be different for different kinds of lids, depending on their weight and size. Although other than circular openings may be used, it is desired that the openings generally be spaced about 0.5 to 3.0 centimeters from center to center thereof, when conveying beer can lids. In some cases, it may be desirable to use a single elongated opening viz a slit extending along the side 27 and 28. An adjustable plate to close or open the slit to adjust the amount of the air vented from the channel passage may be used with the usual slot in the adjustable plate with a bolt or screw screwable in the underside wall that can be loosened or tightened to permit said adjustment.

Figure 5:
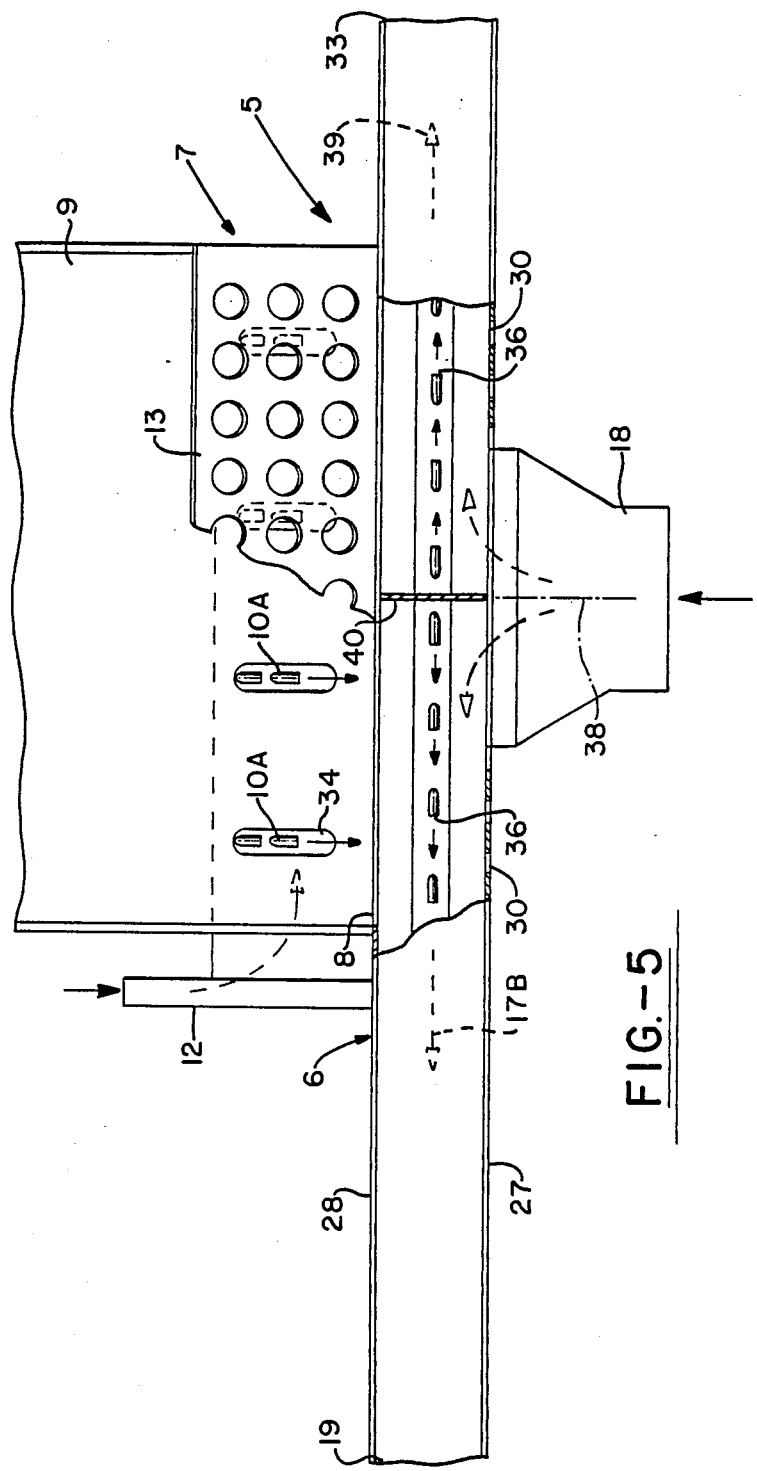
FIG. 5 is a partial view of a modification of apparatus of FIG. 1 that splits the feed to convey the feed in two directions.

Those of ordinary skill know that the stamping press or shell press of the minster press type seperate the lids coming from the punching operation to be carried by a number of belt conveyors to a like number of curling machines. Likewise, the apparatus of this invention can be adapted to send lids from feed means in two directions to feed two curling machines for example. In the embodiment where the feed is split the feed means 7 is positioned in opening 8 more nearly in center of the tunnel as shown in FIG. 5 and the air inlets 10B are reversed at the point where the split is to occur to permit the air flow from part of the inlet 10B to be in direction of arrow 17B while the air flow in the other part or end of the tunnel is reversed so the air flow is opposite to that of arrow 17B as plainly shown by arrow 39 to cause the lids to flow past end 33. This reversing of the air flow is accomplished by reversing the direction of the side walls 20 and 21 in tunnel section from midpoint 38 to end 33. This reversing of side walls 20 and 21 in this section of the tunnel causes air inlets or spouts 10B to direct air to flow in the direction of arrow 39. Also, in this embodiment the air duct 18 is positioned preferably equally on each side of midpoint 38. Air duct 18 may be left as in FIG. 1 but control of movement of the lids in that direction of the tunnel to end 19 and 39 may be more difficult and require the operator to visually adjust the lid movement.

In regard to the apparatus stainless steel would be suitable for construction where consumable goods are to be handle. Thus, the air inlets 10A and 10B are made preferably by punching or die stamping with a lid head that causes the stainless steel or other material of construction to have a recessed area 34 with the air inlets 35, therein. This feature is shown in greater detail in FIG. 3. The air inlets 35 have jet ports, spouts, orifices or spout openings 36 therein, as best seen in FIGS. 2 and 3, to permit the pressurized fluid to spout or jet out in the direction shown by the respective arrows from air chambers 11, 25 or 26 respectively. When handling lids, such as beer cans air inlet chamber 37 is about 0.2 to 0.8 and preferably about 0.3 to 0.6 cm in length with jet port 36 openings of about 0.02 to 0.8 and preferably about 0.3 to 0.6 cm in diameter and the jet port 36 openings are spaced usually about 0.3 to 1.2 and preferably 0.6 to 1.0 cm apart for ordinary can lids and bottoms but as size i.e. the diameter of the lid and its weight changes, the person of ordinary skill may need to make changes in the dimensions. For instance the distance from closure wall 27 to 28 has to vary as the lid diameter changes but with the ordinary beer can about 0.3 to 0.6 cm greater than diameter of the can is sufficient. Likewise the distance between side walls 20 and 21 vary depending on thickness of the flat article. Thus, a sheet of can metal about 0.16 cm thick theoretically should need a passage about double or triple that thickness except the die punching the lid from the sheet puts crimps and leaves burrs on the lid so the usual beer can needs at least about 0.33 cm and preferable 0.4 to 0.6 cm width between side walls 20 and 21. Of course, a lid for a gallon paint pail would required even greater distance. It is highly desirable that air inlets be recessed beneath the surface of its respective side wall or the flat plate.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. An apparatus for fluid conveying flat articles in spaced relationship comprising a tunnel having a passage therein to convey said articles by fluid from a feed entrance opening to an exit opening and a feed means to feed said articles into said tunnel, said tunnel being formed by a first pair of spaced opposite side walls having spaced fluid injection means therein to admit fluid from said opposite walls into the passage, a second pair of spaced opposite closure walls to close the passage, each of said second pair of closure walls having at least an opening or openings essentially from end to end of said second pair of walls to vent excess fluid from said passage but retain sufficient fluid to convey the articles through the exit opening, said feed entrance opening being positioned near one end of said tunnel and opposite another end of the tunnel with the exit opening and positioned essentially parallel with and in one of the closure walls of said passage with the feed means being positioned in said entrance opening, said feed means comprising a flat member having a series of fluid inlets to move said articles into said passageway and an inclined foraminous member positioned above said flat member to cause said articles to assume a flat relationship with the flat member, said fluid inlet having nozzles aligned to direct said fluid therefrom along the said flat member to move said articles into said passage while direction of fluid from fluid inlet spouts in the first pair of walls effect a movement at an angle to that of fluid from the nozzles to move said articles through the passage and said exit opening.

2. The apparatus of claim 1 wherein the fluid injection means is recessed in their respective walls.

3. The apparatus of claim 1 wherein the passage has essentially shape of a cross with one arm of said cross being shorter than other pair of lateral arms.

4. The apparatus of claim 3 wherein the lateral arms have a total length greater than flat dimension of the flat article but no greater than the flat dimension plus 0.5 centimeters.

5. The apparatus of claim 1 wherein the openings in the second pair of walls are spaced from about 0.8 to 1.5 centimeters apart.

6. The apparatus of claim 5 wherein the openings have diameter of abut 0.4 to 0.8 centimeters.

7. The apparatus of claim 1 wherein the passage is channel like in shape.

8. The apparatus of claim 1 where the movement at an angle to that of fluid from the nozzles is an obtuse angle.

9. The apparatus of claim 1 where the movement at an angle is 90° or slightly more.

10. A method of fluidized conveying of essentially flat article comprising the steps of supplying said article to a feed means where each article is contacted with a stream of fluid to suspend and to move the article in direction of a tunnel opening in a side of a tunnel and into said tunnel, contacting in one side of said tunnel each of flat sides of said article as the article enters the tunnel with streams of fluid to change direction of travel of said article sufficient to move said flat articles through and out of the tunnel while maintaining at periodic intervals on flat sides of the article contact with other streams of fluid to move said article through a tunnel exit, and venting part of said streams through vents in sides of the tunnel.

11. The method of claim 10 wherein the fluid is air of about 5 to 60 PSI.

12. The method of claim 11 wherein the air in feed means moves essentially parallel with surface of the feed means in direction of the tunnel opening.

13. The method of claim 12 wherein the air comes from spaced apart aligned series of openings in the surface of the feed means and the side walls, respectively.

14. The method of claim 10 wherein the fluid is air.

15. The method of claim 14 wherein the fluid streams from a surface of the feed means and the pair of side walls of the tunnel are in direction essentially parallel with said surface of the feed means and said side walls respectively.

16. The method of claim 10 wherein the vents are in the side wall of the tunnel opposite the side wall with the tunnel opening.

17. An apparatus for fluid conveying flat articles in spaced relationship comprising a tunnel having a passage therein to convey said articles by fluid from a feed entrance opening near an end of the tunnel to an exit opening and a feed means to feed said articles into said tunnel, said tunnel being formed by a first pair of spaced opposite side walls having spaced fluid injection means therein to admit fluid from said opposite walls into the passage, a second pair of spaced opposite closure walls to close the passage, each of said second pair of closure walls having at least an opening or openings essentially from end to end of said second pair of walls to vent excess fluid from said passage but retain sufficient fluid to convey the articles through the exit opening, said feed entrance opening being positioned in a closure wall near said end of said tunnel and positioned essentially parallel with and in one of the closure walls of said passage, and having a feed means positioned in said entrance opening, said feed means comprising a flat member, an inclined foraminous member spaced above said flat member to permit said article to move therebetween the entrance opening and a series of fluid inlets positioned to direct the fluid against said article in between the flat member and the foraminous member to move the article to and through said entrance opening, said fluid injection means contacting said article emerging from the entrance opening to effect a movement at an angle to that of the article through said entrance opening and move the article through the passage and out the exit opening.

* * * * *